Nov. 8, 1932.   H. C. BOWEN   1,886,936
FLUID PRESSURE OPERATED BRAKE MECHANISM
Filed Aug. 18, 1928   2 Sheets-Sheet 2
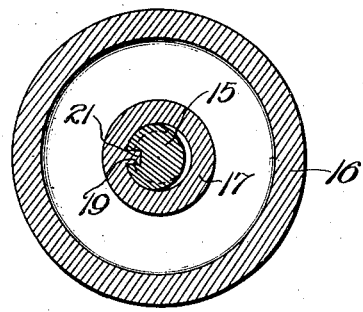
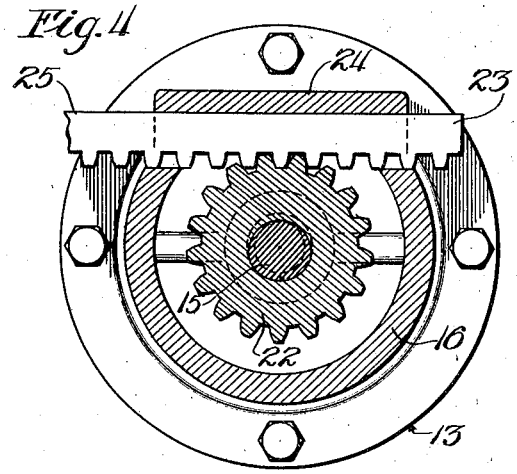
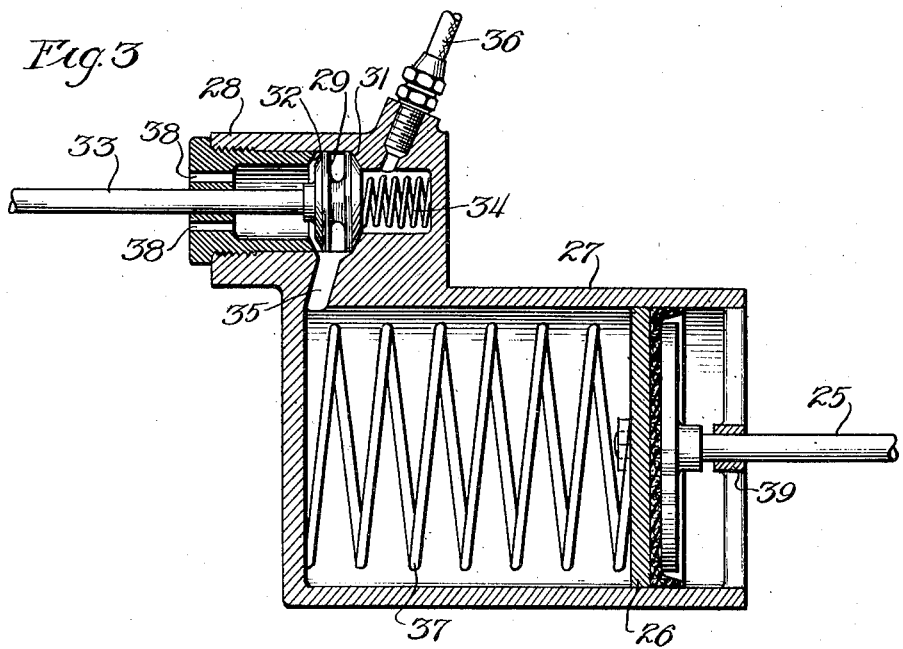
Inventor:
Herbert C. Bowen
By Williams, Bradbury, McCaleb & Hinkle
Attys.

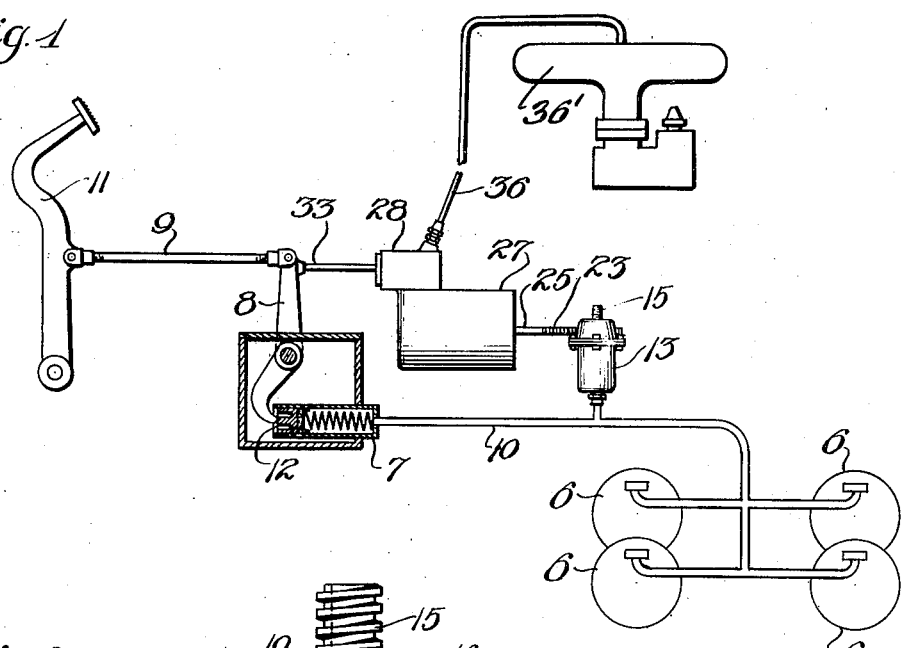

Patented Nov. 8, 1932

1,886,936

UNITED STATES PATENT OFFICE

HERBERT C. BOWEN, OF ROYAL OAK, MICHIGAN, ASSIGNOR TO HYDRAULIC BRAKE COMPANY, OF DETROIT, MICHIGAN, A CORPORATION OF CALIFORNIA

FLUID PRESSURE OPERATED BRAKE MECHANISM

Application filed August 18, 1928. Serial No. 300,407.

REISSUED

This invention relates to a fluid pressure operated brake mechanism, and more particularly to a device for applying an initial pressure to a fluid operated brake system prior to the application of the brake operating pressure.

In fluid pressure operated brake systems there is frequently a lost motion between the pressure applying device and the brakes due in part to a loose fit or play between the mechanically inter-connected parts and to the clearance between the brake shoes and drums when the brake shoes are retracted from the drums, which often results in a considerable movement of the pressure applying device before the brakes become effective.

An object of the invention is to provide an apparatus for applying an initial pressure to the fluid pressure operated system prior to the application of the brake operating pressure to remove the slack therefrom.

A further object of the invention is to provide a slack remover operable by energy received from the manifold of the motor for propelling a motor vehicle.

Other objects and advantages of the invention will appear as the description proceeds.

A complete understanding of the invention may be had by reference to the following description taken in conjunction with the accompanying drawings, in which Fig. 1 represents schematically an apparatus embodying the invention for applying the brakes in a fluid pressure operated brake system;

Fig. 2 is a cross sectional view of the cylinder for applying the initial slack removing pressure to the system;

Fig. 3 is a cross sectional view of a fluid pressure actuated cylinder for operating the initial pressure cylinder shown in Fig. 2;

Fig. 4 is a cross sectional view taken on lines 4—4 of Fig. 2, and

Fig. 5 is a cross sectional view taken on the lines 5—5 of Fig. 2.

Referring to the drawings, and more particularly to Fig. 1, a plurality of brakes 6 are actuated by the pressure produced in a master cylinder 7. The master cylinder 7 is operated by a lever 8 which is connected through a link 9 to a manually operable pedal 11 and serves to reciprocate a piston 12 within the master cylinder 7 to communicate a pressure through a tube 10 to the brakes 6.

A secondary cylinder 13 is also connected through the tube 10 to the pressure system and has a piston 14 reciprocally mounted therein. Attached to the piston 14 is a threaded piston rod 15 which is slidably mounted in a bearing cap 16 having an upper bearing 17 and a lower bearing 18. The piston rod 15 is provided with a longitudinal groove 19 into which a projection 21 of the upper bearing 17 extends for the purpose of allowing longitudinal movement of the piston rod and preventing rotative movement thereof.

A pinion 22 is supported between the bearings 17 and 18 and is provided with an internal thread which engages the threads of the piston rod 15. The threads of the piston rod 15 and the pinion 22 are of such a pitch that the connection is irreversible; that is, a rotation of the pinion 22 will cause a longitudinal movement of the piston rod 15, but a longitudinal force exerted upon the piston rod 15 will not cause a rotation of the pinion 22. In order to rotate the pinion 22 a rack 23 is held in engagement therewith by a support 24 integral with the bearing cap 16.

The rack 23 is formed integral with a piston rod 25 which is attached to the piston 26 reciprocally mounted in a cylinder 27. Supported on the upper portion of the cylinder 27 is a valve mechanism 28 having a double valve 29 which may be engaged with either the valve seat 31 or the valve seat 32.

A valve stem 33 for operating the valve extends from the valve mechanism and contacts with the lever 8 which holds the valve 29 in engagement with the seat 31 when the lever 8 is in its inoperative position, in which position of the valve the cylinder 27 is connected through a duct 35 to a plurality of ports 38 leading to the atmosphere. Upon a slight movement of the lever 8 a spring 34 will shift the valve 29 into engagement with the valve seat 32 in which position of the valve the cylinder 27 will be connected through the duct 35 to a tube 36 leading to the manifold 36' of the vehicle motor.

The operation of the apparatus is as follows:

When the pedal 11 is depressed to apply the brakes a slight movement of the lever 8 will withdraw it from the valve stem 33 allowing the spring 34 to move the valve 29 to its left hand position. This results in connecting the cylinder 27 through the duct 35 to the tube 36 which leads to the manifold of the motor vehicle in which the operation of the motor constantly maintains a vacuum. The vacuum thus applied to the cylinder 27 tends to withdraw the air therefrom and allows the atmospheric pressure to force the piston 26 into the cylinder 27 against the action of a spring 37. The movement of the piston 26 causes the rotation of the pinion 22 through the rack 23 and moves the piston rod 15 in a downward direction applying an initial pressure to the fluid pressure system to remove the slack from the system and engage the brake shoes with the drums but with insufficient force to produce a braking effect. At this time the lever 8 will have moved only far enough to operate the valve 29. As the pressure in the system increases, due to the continued movement of the lever 8 in applying the brakes, the piston 14 will not be forced upwardly on account of the irreversible connection between the piston rod 15 and the pinion 22.

The initial pressure produced in the cylinder 13 therefore remains effective during the entire braking process, and the piston 14 is not withdrawn until the lever 8 resumes its normal position and moves the valve 29 to its right hand position. When the valve 29 is returned to its right hand position the cylinder 27 is connected through duct 35 and ports 38 to the atmosphere, allowing the spring 37 to move the piston 26 outwardly until it engages the bearing 39, which limits its outward movement, restoring the piston 14 in the cylinder 13 to its normal position.

It will be seen, therefore, that the apparatus serves to apply an initial pressure to the fluid pressure system and retain that pressure during the entire braking process.

The embodiment of the invention herein described and illustrated is merely a convenient and useful form of the invention which is capable of many other modifications without departing from the spirit and scope of the invention, which is to be limited only by the scope of the appended claims.

I claim:

1. The combination in a fluid pressure operated brake system, of means for producing a pressure in the system, a cylinder having a piston for producing an initial pressure, and fluid pressure operated means for actuating the piston of said cylinder.

2. In a fluid pressure operated brake system, a master cylinder and piston, means for actuating the piston of the master cylinder to produce a pressure in the system, and fluid pressure actuated means responsive to the initial movement of said actuating means for removing the slack from the brake system.

3. In a fluid pressure operated brake system, means for producing a fluid pressure in the system, means movable to actuate the pressure producing means, and fluid pressure actuated means responsive to the initial movement of the movable means to remove the slack from the system.

4. In a fluid pressure operated brake system, a slack remover comprising a cylinder, a piston in said cylinder, and an irreversible driving connection for moving the piston in the cylinder to remove the slack from the system.

5. In a fluid pressure operated brake system, a slack remover comprising a cylinder, a piston in said cylinder, a threaded piston rod for moving the cylinder, a rotatable threaded member engaging the threads of the piston rod, and fluid pressure means for rotating said rotatable member.

6. The combination in a fluid operated system, a main pressure means, a secondary pressure means, fluid pressure actuated means for completely operating the secondary pressure means upon a partial operation of the main pressure means, and means for causing the secondary pressure means to remain in its operated position until the main pressure means has returned to normal position.

7. The combination in a fluid pressure operated system, a master cylinder having a piston, means for operating the piston of the master cylinder, a secondary cylinder having a piston, and means for operating the piston of the secondary cylinder comprising a fluid operated cylinder, and means for connecting said fluid operated cylinder to a source of energy upon a slight movement of the means for operating the piston of the master cylinder.

8. The combination in a fluid pressure operated system, a master cylinder having a piston, means for operating the piston of the master cylinder, a secondary cylinder having a piston, and means for operating the piston of the secondary cylinder comprising a fluid operated mechanism, a valve associated with the fluid operated mechanism for causing the operation of the fluid operated mechanism upon a movement of the means for operating the piston of the master cylinder and retaining the fluid operated mechanism in its operated position until the means for operating the piston of the master cylinder has returned to normal position.

9. The combination in a fluid pressure operated brake system, a master cylinder, a piston therefor, means for actuating said piston to produce a brake operating fluid pressure in the brake system, a secondary cylinder, a piston in said secondary cylinder, a threaded piston rod attached to the secondary cylinder piston, an internally threaded pinion engaging said threaded piston rod, a pressure actuated cylinder having a piston therein, a piston rod therefor adapted to rotate said pinion, and means for producing an operating pressure in the pressure cylinder upon a movement of the means for actuating the piston of the master cylinder whereby the secondary cylinder is caused to produce a slack removing pressure in the brake system prior to the brake operating pressure.

10. The combination in a fluid pressure operated brake system, a master cylinder, a piston therefor, means for actuating said piston to produce a brake operating pressure in the system, a secondary cylinder, a piston therefor, a threaded piston rod attached to said piston, an internally threaded pinion engaging the threaded piston rod, a fluid pressure operated cylinder, a piston therefor, a piston rod attached to said last mentioned piston adapted upon its movement to rotate said pinion, means including a valve for connecting the pressure operated cylinder to a source of low pressure, and means for operating said valve upon the initial movement of the means for actuating the piston of the master cylinder whereby the pressure operated cylinder causes the secondary cylinder to produce a slack removing pressure in the system prior to the brake operating pressure.

11. The combination in a fluid operated system of a master cylinder, a piston for producing a pressure in said cylinder, a secondary cylinder, a piston for producing a pressure in said secondary cylinder, fluid pressure actuated means operably connected with the piston in said secondary cylinder whereby it is moved its full amount coordinately with the partial movement of the piston in said master cylinder, and means operably connected with the piston of said secondary cylinder after the piston of said master cylinder has returned to its normal position to return the piston of said secondary cylinder to its normal position.

12. The combination in a fluid operated system of a main pressure means, a secondary pressure means, a control means on said main pressure means, disengageable from said secondary pressure means upon a partial operation of the main pressure means whereby the said secondary pressure means is completely operated.

In witness whereof, I hereunto subscribe my name this 14th day of August, 1928.

HERBERT C. BOWEN.